United States Patent [19]

Nilsson

[11] Patent Number: 5,075,050

[45] Date of Patent: Dec. 24, 1991

[54] METHOD FOR CONTROLLING SOME PARAMETERS IN CONNECTION WITH MANUFACTURING OF PLASTIC ARTICLES

[76] Inventor: Bo Nilsson, Postbox 3139 K Gräsö, S-740 71 Öregrund, Sweden

[21] Appl. No.: 460,144

[22] PCT Filed: Aug. 4, 1988

[86] PCT No.: PCT/SE88/00396

§ 371 Date: Jan. 29, 1990

§ 102(e) Date: Jan. 29, 1990

[87] PCT Pub. No.: WO89/01397

PCT Pub. Date: Feb. 23, 1989

[30] Foreign Application Priority Data

Aug. 7, 1987 [SE] Sweden .................................. 8703092

[51] Int. Cl.$^5$ ...................... B29C 45/76; B29C 47/92; B29C 49/78
[52] U.S. Cl. ................................. 264/40.1; 264/40.4; 264/40.6; 425/144
[58] Field of Search .................... 264/40.1, 40.4, 40.7, 264/40.6; 425/140, 144, 148, 170

[56] References Cited

U.S. PATENT DOCUMENTS

| | | | |
|---|---|---|---|
| 3,148,231 | 9/1964 | Spencer | 264/40.6 |
| 3,649,147 | 3/1972 | Fritsch | 425/170 |
| 4,171,193 | 10/1979 | Rahlfs | 264/40.7 |
| 4,213,747 | 7/1980 | Friedrich | 425/144 |
| 4,613,471 | 9/1986 | Harris | 425/148 |
| 4,667,852 | 5/1987 | Siemann | 222/54 |
| 4,721,589 | 1/1988 | Harris | 264/40.1 |
| 4,816,197 | 3/1989 | Nunn | 425/140 |
| 4,858,139 | 8/1989 | Wirtz | 425/145 |

FOREIGN PATENT DOCUMENTS 1964386 7/1971 Fed. Rep. of Germany .
2700003 7/1978 Fed. Rep. of Germany .

*Primary Examiner*—Jan H. Silbaugh
*Assistant Examiner*—Catherine Timm
*Attorney, Agent, or Firm*—Witherspoon & Hargest

[57] ABSTRACT

A method for a supervising and/or controlling of discharged volume or weight of plastic mass flow for e.g. extrusion, injection moulding or blow moulding in a system including a plastification section, which feeds the plastic melt to a volumetric discharge device. This discharge device discharges in turn the molten material continuously or in portions to a forming tool. The pressure and temperature of the plastic melt is determined in connection with the discharge device and the density of the plastic material is calculated by means of these measured values.

10 Claims, No Drawings

METHOD FOR CONTROLLING SOME PARAMETERS IN CONNECTION WITH MANUFACTURING OF PLASTIC ARTICLES

The present invention relates to methods for manufacturing of plastic articles, and more closely to such a method giving rise to plastic articles having desired wall thickness, weight per meter and/or weight per piece.

The invention is primarily intended to be used in connection with the forming of plastic articles by extrusion, such as blown film and foil extrusion, cable extrusion plastic coating, pipe and rod extrusion, but the invention may also, after modifying of the discharge section, be adapted to processes for blowing of bottles and injection moulding.

By the invention it has been possible to manufacture plastic articles having precise dimensions without use of instruments for measuring the thickness or for measuring some other dimension, or complicated and expensive weighing equipment for batch weight as referred to in e.g. DAS 1 964 386.

An essential problem in connection with the manufacturing of plastic articles is to be able to maintain an even quality of the articles, and then especially with regard to the wall thickness. The thickness variations occurring in connection with e.g. film and foil manufacturing, are resulting in that nominal correct thickness vary above as well as under said thickness. The result thereof is that one either accepts a product the thickness of which is incorrect, or one has to manufacture a product being thicker than the nominal one in order to be able to guarantee desired thickness. In the one case the quality is faulty and in the other case the plastic consumption is unsatisfactory high. The latter case also gives rise to not only increased costs for the consumed plastic but also for heating, extrusion energy, transportation and so on.

To overcome the above problems thickness measuring instruments have been used within the plastic industry, but these instruments have caused problems due to often used additives such as pigments and similar, due to variations of the temperature of the sensed article through the thickness thereof, and due to the fact that plastic temperature variations have appeared caused by conditions depending upon different times of the year and/or product and manufacturing conditions. Accordingly, the result is that a great number of calibration constants have been necessary to identify, which the operator then has had to take into consideration for the continued production. The result thereof is that on-line measuring of the thickness generally is an unpractical and unreliable method which cannot be used successfully for manual or automatic control of the manufacturing process.

Another attempt to get rid of said deficiencies is described in DAS 1 964 386. This attempt includes the development of a weighing method for the batch weight in accordance with which the material is supplied to the extruder or corresponding machine is weighed, batch by batch or continuously, and for a set amount of weighed input material determines manufactured length or time of manufacture. Thereby, it is possible to calculate weight per meter or production per time unit. The weight per length or time unit is then determined by means of a level switch mounted in the lower portion of the extruder funnel or in the pipe between the extruder funnel and the extruder. The closer the extruder and the less area at the place of measuring the better the accuracy of the weighing. However, this leads to the fact that a very small reserve amount of raw material is maintained before the extruder which in connection with trouble in the delivery of raw material or in the weighing equipment for the input material gives rise to production stop and deficiencies in the manufactured product. Production stop means loss of time and reduced profitability and unnecessary deficiencies in the manufactured article and involve extra trouble for taking care of these faulty articles and increased costs.

In the conventional technique in use today for manufacturing of plastic articles, an extruder is used comprising a rotary screw arranged within a cylinder, which screw is responsible for the processing and homogenization of the plastic material as well as the discharge thereof to a tool or to a mould for forming the final product. In connection with extrusion, this takes place continuously while injection moulding and in some cases blow moulding make use of a discontinuous discharging, preferably carried out by an axial movement of the screw in which case the screw operates in a way similar to a piston pump.

The flights of the screw do not work with complete sealing against the surrounding cylinder wall but a slight flow backwards of the material takes place in the gap between the wall and the flights of the screw, which gives rise to the fact that the pumping efficiency is effected on one hand by the viscosity and pressure of the melt and on the other hand depending upon the degree of wear of the screw. These facts give rise to variations in the discharged amount per time unit, in turn resulting in increased scrap level due to product variations and to bad raw material efficiency.

The above problems are solved by the present invention by separating plastification and discharge from each other.

Also in this case, the plastification section may comprise a screw rotating within a cylinder. However, as the plastification section does not need to be used to build up pressure for the subsequent extrusion, this section may be optimal in order to only carry out the processing of the plastic, i.e. the plastification and the homogenization. This leads to a better efficiency with relation to this section and thereby one also obtains energy savings. Also other types of plastification and homogenization principles may be used such as kneading and/or melting during heat supply and stirring.

The discharging section is based upon a volumetric metering device, such as a gear pump or a piston pump. The piston pump may be provided with a device making an alteration of the displacement thereof possible, e.g. by changing the stroke length and/or diameter thereof.

The change of density of the plastic due to effect from pressure and temperature is in accordance with the invention used for control of some parameters in connection with the manufacturing of plastic articles. For example, the discharge unit can be controlled by manually or automatically adjusting the discharge unit to produce goods having desired cross section area or volume per piece. The density of the raw material is stated in the material specification and may be used as initial value, referred to herein as the "nominal density", and be used in combination with measured pressure and temperature for calculation of the density at the place of measuring. The density of the additives are normally very close to the density of the plastic and further, constitute so relatively small amounts that the additives do not affect the density of the plastic itself in any degree that would effect the final result.

By measuring pressure and temperature on the suction side of the discharge pump in connection with extrusion, it is possible to determine the production in weight per time unit, preferably grams per minute, and together with measuring of the length, to determine the weight per meter and in connection with the injection moulding and blow moulding weight per manufactured unit. The measuring of pressure and temperature on the suction side of the pump constitute in this connection two parameters from which it is possible to determine the density of the plastic mass at the discharge from the pump and which, due to the fact that the volume discharged from the pump is known by appointing either its r.p.m. or the total number of revolutions per discharge or the discharge of the piston pump per cycle, can give the basis for determining the production. In this embodiment, the discharged volume per time unit or per discharging time is constant.

The density may also be calculated by controlling the process to constant pressure and temperature on the suction side of the discharge pump. In this case, the density may be set as the calculated value of the density at the set points given for pressure and temperature.

By the above steps brought into practice, the objective is reached to arrive at accurate control of desired dimensions of the final product without obtaining unreliable safety in the production due to too small reserve of material before the extruder, what might lead to immediate production stop if there are break downs in the material delivery or problems in the input weighing system.

A man skilled in the art may modify the invention in different ways, but such modifications are intended to be within the scope of the invention as defined in the attached claims.

I claim:

1. Method of controlling process parameters to obtain substantially constant dimensions of articles of plastic material manufactured by extrusion, blow moulding or injection moulding in which a volumetric discharge unit is used for discharge of a flow of plastic mass of said plastic material to a forming tool, comprising the steps of discharging said plastic mass at a constant volume per time unit or per discharging time, measuring pressure and temperature of the plastic mass flow at a position before the discharge unit, calculating the density of the plastic mass flow at said position to obtain a calculated value for the density starting from nominal density of the plastic mass, establishing the weight of the articles manufactured per discharge time or per time unit by multiplying the calculated density with the discharged volume per discharge time or per time unit, and controlling process parameters based upon changes of the calculated density of the plastic mass flow to obtain said substantially constant dimensions of said articles of said plastic material.

2. Method in accordance with claim 1, characterized by that in the controlling step the discharge unit is adjusted so that the articles produced have a set desired weight per length unit or per article.

3. Method in accordance with claim 1, characterized by that in the controlling step the discharge unit is adjusted so that the articles produced have a set desired cross sectional area or volume per article.

4. Method in accordance with claim 2, characterized by that in the controlling step the discharge unit is adjusted so that the articles produced have a set desired cross sectional area or volume per article.

5. Method in accordance with claim 2 wherein in the controlling step the discharge unit is adjusted manually.

6. Method in accordance with claim 2 wherein in the controlling step the discharge unit is adjusted automatically.

7. Method in accordance with claim 3 wherein in the controlling step the discharge unit is adjusted manually.

8. Method in accordance with claim 3 wherein in the controlling step the discharge unit is adjusted automatically.

9. Method in accordance with claim 4 wherein in the controlling step the discharge unit is adjusted manually.

10. Method in accordance with claim 4 wherein in the controlling step the discharge unit is adjusted automatically.

* * * * *